(12) United States Patent
Tayloe et al.

(10) Patent No.: US 7,110,766 B1
(45) Date of Patent: Sep. 19, 2006

(54) METHOD OF GENERATING A HANDOFF CANDIDATE LIST

(75) Inventors: Daniel R. Tayloe, Phoenix, AZ (US); Shawn W. Hogberg, Chandler, AZ (US); Douglas E. Wright, Gilbert, AZ (US)

(73) Assignee: Motorola, Inc., Schaumburg, IL (US)

( * ) Notice: Subject to any disclaimer, the term of this patent is extended or adjusted under 35 U.S.C. 154(b) by 0 days.

(21) Appl. No.: 11/142,058

(22) Filed: May 31, 2005

(51) Int. Cl.
*H04Q 7/20* (2006.01)
(52) U.S. Cl. ............... 455/438; 455/439; 455/436; 370/331; 370/332
(58) Field of Classification Search ........... 455/438, 455/439, 436; 370/331, 332
See application file for complete search history.

(56) References Cited

U.S. PATENT DOCUMENTS

| | | | |
|---|---|---|---|
| 5,640,676 A | 6/1997 | Gamcarz et al. | |
| 5,678,184 A | 10/1997 | Cutler, Jr. et al. | |
| 5,946,621 A | 8/1999 | Chheda et al. | |
| 6,119,005 A | 9/2000 | Smolik | |
| 6,195,342 B1 | 2/2001 | Rohani | |
| 6,201,968 B1 | 3/2001 | Ostroff et al. | |
| 6,360,098 B1 | 3/2002 | Ganesh et al. | |
| 6,411,819 B1 | 6/2002 | Gutowski | |
| 6,415,149 B1 * | 7/2002 | Bevan et al. | 455/442 |
| 6,430,414 B1 | 8/2002 | Sorokine et al. | |
| 6,505,043 B1 | 1/2003 | Aihara | |
| 6,542,743 B1 | 4/2003 | Soliman | |
| 6,545,984 B1 | 4/2003 | Simmons | |
| 6,725,043 B1 | 4/2004 | Bonta et al. | |
| 6,731,936 B1 * | 5/2004 | Chen et al. | 455/437 |
| 6,744,747 B1 | 6/2004 | Shiu et al. | |
| 6,754,497 B1 | 6/2004 | Ozluturk | |
| 6,819,923 B1 | 11/2004 | Friman | |
| 6,829,491 B1 | 12/2004 | Yea et al. | |
| 6,856,803 B1 | 2/2005 | Gross et al. | |
| 6,940,838 B1 * | 9/2005 | Stead | 370/335 |
| 6,973,312 B1 * | 12/2005 | Ngan et al. | 455/442 |
| 2005/0096055 A1 * | 5/2005 | Colban et al. | 455/442 |
| 2005/0124344 A1 * | 6/2005 | Laroia et al. | 455/436 |
| 2005/0124345 A1 * | 6/2005 | Laroia et al. | 455/437 |
| 2005/0186964 A1 * | 8/2005 | Aikawa et al. | 455/452.2 |

* cited by examiner

*Primary Examiner*—Danh Cong Le
(74) *Attorney, Agent, or Firm*—Kevin D. Wills

(57) ABSTRACT

A method of generating a handoff candidate list (490) to provide to a mobile station (302) may include providing the mobile station in a multi-sector handoff state (360) with a unique combination of a plurality of sectors (362, 363, 364), and recording at least one target sector (371, 372, 373) selected from a plurality of available sectors (366) that is added to the unique combination of the plurality of sectors. The recording step may be iteratively performed whenever the mobile station is in the multi-sector handoff state with the unique combination of the plurality of sectors thereby defining the at least one target sector that has actually been used by the mobile station in the multi-sector handoff state with the unique combination of the plurality of sectors. Upon the mobile station entering the multi-sector handoff state with the unique combination of the plurality of sectors, providing the handoff candidate list to the mobile station, wherein the handoff candidate list comprises the at least one target sector.

22 Claims, 5 Drawing Sheets

METHOD OF GENERATING A HANDOFF CANDIDATE LIST

BACKGROUND OF INVENTION

Propagation conditions from cellular base stations to mobile stations can change rapidly given terrain, weather, the location of the mobile station, etc. If a mobile station cannot detect and establish contact with a new base station before the signal from the existing base station fades away, the call may get dropped. The current method of recognizing and establishing communication with a new base station uses a handoff list for each base station sector, where each handoff list contains handoff target sectors in all directions. When the mobile station has more than one handoff leg, the list from each sector is combined using a round-robin selection process to arrive at a handoff list usually containing 20 handoff candidates. The time required for this process is not trivial and the results can include handoff candidates that have an extremely low probability of ever being used given the current handoff state of the mobile station.

There is a need, not met in the prior art, for a method of generating and providing a handoff candidate list to a mobile station that minimizes the number of handoff candidates. For example, there is a need, not met in the prior art, of decreasing the number of handoff candidates from the current maximum number handoff candidates. Accordingly, there is a significant need for an apparatus and method that overcomes the deficiencies of the prior art outlined above.

BRIEF DESCRIPTION OF THE DRAWINGS

Representative elements, operational features, applications and/or advantages of the present invention reside inter alia in the details of construction and operation as more fully hereafter depicted, described and claimed—reference being made to the accompanying drawings forming a part hereof, wherein like numerals refer to like parts throughout. Other elements, operational features, applications and/or advantages will become apparent in light of certain exemplary embodiments recited in the Detailed Description, wherein:

Figure 1:
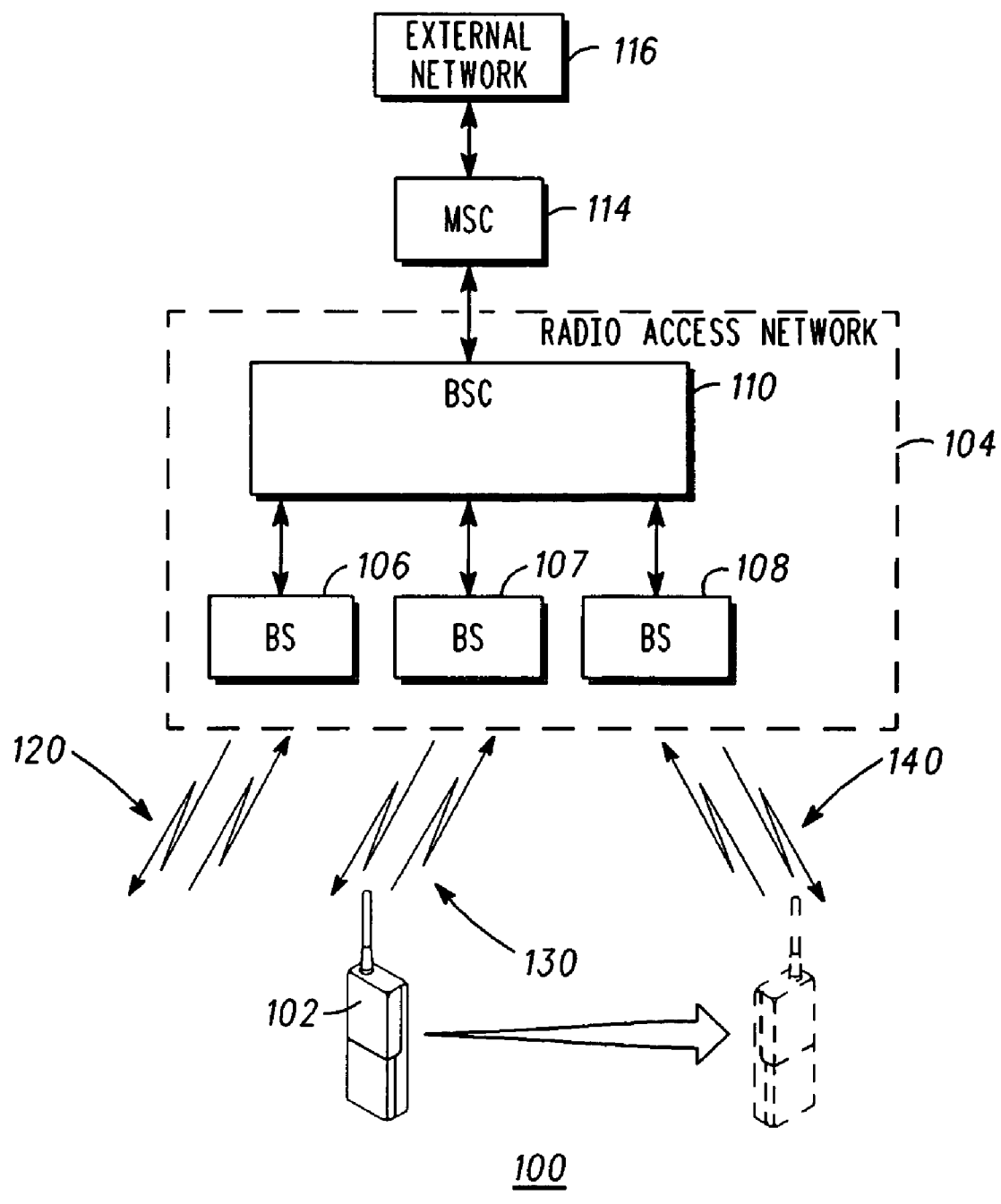
FIG. 1 representatively illustrates a wireless network in accordance with an exemplary embodiment of the present invention.

Elements in the Figures are illustrated for simplicity and clarity and have not necessarily been drawn to scale. For example, the dimensions of some of the elements in the Figures may be exaggerated relative to other elements to help improve understanding of various embodiments of the present invention. Furthermore, the terms "first", "second", and the like herein, if any, are used inter alia for distinguishing between similar elements and not necessarily for describing a sequential or chronological order. Moreover, the terms "front", "back", "top", "bottom", "over", "under", and the like in the Description and/or in the Claims, if any, are generally employed for descriptive purposes and not necessarily for comprehensively describing exclusive relative position. Any of the preceding terms so used may be interchanged under appropriate circumstances such that various embodiments of the invention described herein may be capable of operation in other configurations and/or orientations than those explicitly illustrated or otherwise described.

DETAILED DESCRIPTION OF EXEMPLARY EMBODIMENTS

The following representative descriptions of the present invention generally relate to exemplary embodiments and the inventor's conception of the best mode, and are not intended to limit the applicability or configuration of the invention in any way. Rather, the following description is intended to provide convenient illustrations for implementing various embodiments of the invention. As will become apparent, changes may be made in the function and/or arrangement of any of the elements described in the disclosed exemplary embodiments without departing from the spirit and scope of the invention.

A detailed description of an exemplary application, namely a method of generating and providing a handoff candidate list to a mobile station, is provided as a specific enabling disclosure that may be generalized to any application of the disclosed system, device and method in accordance with various embodiments of the present invention.

Wireless communication systems are well known and consist of many types including land mobile radio, cellular radiotelephone (inclusive of analog cellular, digital cellular, personal communication systems (PCS) and wideband digital cellular systems), and other communication system types. In cellular radiotelephone communication systems, for example, a number of communication cells are typically comprised of one or more Base Stations (BS's) coupled to one or more Base Station Controllers (BSCs) and forming a Radio Access Network (RAN). The BSCs may, in turn, be coupled to a Mobile Switching Center (MSC) that provides a connection between the RAN and an external network, such as a Public Switched Telephone Network (PSTN), as well as interconnection to other RANs. Each BS provides communication services to a mobile station (MS) located in a coverage area serviced by the BS via a communication resource that includes a forward link for transmitting signals to, and a reverse link for receiving signals from, the MS.

FIG. 1 representatively illustrates a wireless network 100 in accordance with an exemplary embodiment of the present invention. Wireless network 100 includes a RAN 104 comprising multiple BSs 106–108 that are each coupled to a BSC 110. RAN 104 may be coupled to an MSC 114, and MSC 114 may in turn be coupled to an external network 116 and provide a communication link between the external network, or other RANs, and RAN 104. In an embodiment, RAN 104 is a CDMA network, but may also be a GSM network, and the like.

Wireless network 100 may further include a mobile station 102 coupled to BS 106 via wireless link 120. In an embodiment, wireless link 120 may include a forward link for communications from BS 106 to mobile station 102, and reverse link for communications from mobile station 102 to BS 106.

Fundamental to a wireless communication system is the ability to maintain established communication connections while an MS moves in and between coverage areas. In order to maintain established communication connections, 'soft-handoff' techniques have been developed for code division multiple access (CDMA) communication systems whereby an MS is in concurrent, active communication with multiple BSs. Each BS in active communication with the MS is a member of an 'active set' of the MS and transmits bearer traffic to, and receives bearer traffic from, the MS. As the MS moves through the communication system, BSs are added to, or deleted from, the MS's active set so as to assure that the MS will always be in communication with at least one BS.

Handoff is a process by which a network of base stations and a mobile station maintain their communication when the mobile station travels from one coverage area (cell) to another. Generally, the coverage areas in a wireless network are pre-defined by the geographical locations of its base stations, or may be defined in combination with the loading level of the base stations. Each coverage area is defined as a cell, which is normally served by a base station. Furthermore, each cell may be divided into several sectors such that each sector provides communication in a coverage area.

In CDMA systems, a pilot channel on a specific code channel is transmitted from each base station. If the cell is divided into sectors, a pilot channel is also assigned to each sector. Among other uses, the pilot channels are used to direct the mobile stations handoff routines. Once a mobile station is moved into a coverage area, a handoff candidate list of all cells and sectors that are in the communication system is transmitted to the mobile station. The list contains a list of pilot signals of many cells and sectors. The mobile station is constantly searching for pilot signals of the cells and sectors that are in the list. The mobile station measures the strength of pilot signals, which are then used as criteria to create a list of possible candidate pilot signals for future handoff. Since the list of all pilot signals is typically long (twenty is typical for CDMA), the mobile station spends a relatively long time scanning for all pilot signals.

As an example of an embodiment, wireless communication system 100 may further include an MS 102 that concurrently is in active communication with each of BS 106 and 107. That is, MS 102 is in 'soft-handoff' with each of BSs 106 and 107 and each of BS 106 and BS 107 is a member of an 'active set' of MS 102. As members of the active set of MS 102, each BS of BSs 106 and 107 concurrently maintains a respective wireless communication link 120, 130 with the MS.

Each BS 106, 107 in the active set of MS 102 conveys the same bearer traffic to, and receives the same bearer traffic from, the MS. By providing multiple BSs that concurrently convey same signals to, and receive same signals from MS 102, wireless network 100 enhances the likelihood that the MS will receive an acceptable quality signal from BS 106 and that the BS will receive an acceptable quality signal from the MS.

As MS 102 heads towards a coverage area, or sector, associated with BS 108, a signal strength of a pilot signal received by MS 102 from BS 108 increases until MS 102 identifies the pilot signal from BS 108 as a viable communication link. In addition, as MS 102 heads away from a coverage area, or sector, associated with BS 106 a signal strength of a pilot signal received by MS 102 from BS 106 may deteriorate to the point that MS 102 determines that communication link 120 is no longer a viable communication link. MS 102 then requests that wireless network 100 add BS 108 to the MS's active set, that is, establish a communication link 140 associated with BS 108, as an active communication link for transmitting data to, and receiving data from, MS 102, and drop BS 106 from the active set, that is, terminate communication link 120. Typically, the request to add or drop a BS is conveyed by MS 102 via a Pilot Strength Measurement Message (PSMM). As an example, upon receiving the PSMM message, BS 106 is dropped from the active set of MS 102 and terminates, or drops, communication link 120 between MS 102 and BS 106. Likewise, PSMM's are also used to add BSs or sectors to the active set of the MS. Although the embodiments shown are directed toward a CDMA wireless network, the invention is not limited to a CDMA wireless network. For example the invention may be used in a GSM wireless network, and the like.

Figure 2:
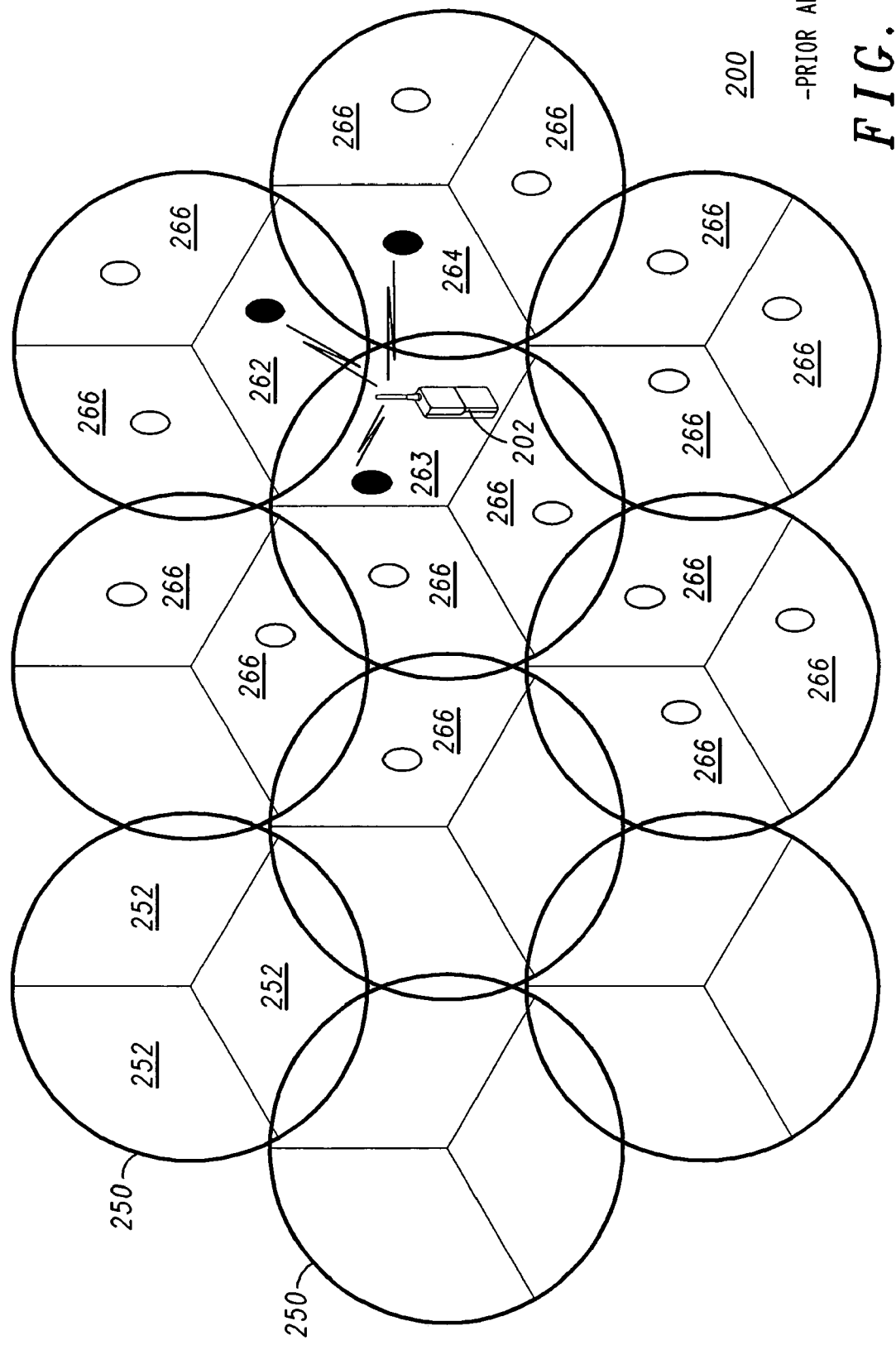
FIG. 2 representatively illustrates a prior art method of generating a handoff candidate list in a wireless network.

FIG. 2 representatively illustrates a prior art method of generating a handoff candidate list in a wireless network 200. The wireless network depicted in FIG. 2 includes any number of coverage areas (cells) 250. In an embodiment, each cell may be divided into any number of sectors 252. In the embodiment shown, a cell is divided into three sectors. However, cells may divided into any number of sectors.

Mobile station 202 depicted in FIG. 2 is in a soft handoff state with three sectors 262, 263, 264. This may be referred to as a multi-sector handoff state as explained above. Also as explained above, the mobile station is constantly checking all pilot signals from the handoff candidate list so as to enter a soft handoff state with any sectors or cells that have a relatively strong signal. In the prior art, the handoff candidate list is generated at the base station controller 110. The list is generated using a separate list for each sector. That is, each sector has a separate list of handoff candidates prioritized with the most frequent (or most likely) handoff target from that sector or cell listed first, the second most frequent handoff target listed second, and so on. The prior art list for each sector is independent and only takes into account frequent handoffs from that sector only. Also, the list is long because it must contain all handoff target sectors in all directions from this one sector. A typical maximum length may be twenty handoff candidate sectors.

When mobile station 202 is in a call that has more than one handoff leg (multi-sector handoff), a combined list (typically twenty) is built using a round-robin selection from the top entries from each of the lists from each of the sectors involved in the call. The round-robin approach will generate a list of handoff candidates based on frequency of use but for each individual sector. The list may contain candidate sectors in each direction from the present position of the mobile station even though a mobile station in such a handoff state may never or rarely use such handoff candidates. But since the handoff candidates are on the list, the mobile will waste time and battery power checking for their pilot signal anyway.

Again, the new combined list can include twenty entries. This means that in a prior art multi-sector handoff situation, building a handoff candidate list tends to guarantee a maximum length list. The longer the list, the less frequently a given sector candidate will be checked by the mobile station 202 to see if that sector now qualifies as a new handoff candidate. Since the use of a maximum length list slows down this search to the maximum possible extent, rapidly changing RF coverage can cause calls to be dropped before a handoff can complete to a new sector or BS capable of serving the call.

FIG. 2 illustrates an example of the prior art method described above. Mobile station 202 is a multi-sector handoff with three sectors 262, 263 264. Each active sector 262, 263, 264 in the multi-sector handoff will have its own list of handoff candidate sectors 266 that will include candidate sectors from all directions of each of the active sectors 262, 263, 264. These lists are combined at the base station controller 110 to arrive at a prior art handoff candidate list, which includes candidate sectors 266 in all directions from mobile station 202. Also, since the lists are combined using a round-robin approach, the prior art handoff candidate list includes the maximum number of candidate sectors 266. Since each candidate sector is checked for pilot signal strength by mobile station 202, it takes mobile station 202 a relatively long time to check all of the candidate sectors 266. Therefore, in a rapidly changing RF environment (such as hilly terrain, tall buildings, etc), the mobile station 202 may lose contact with active sectors 262, 263, 264 prior to establishing contact with a candidate sector 266 having the proper signal strength.

Figure 3:
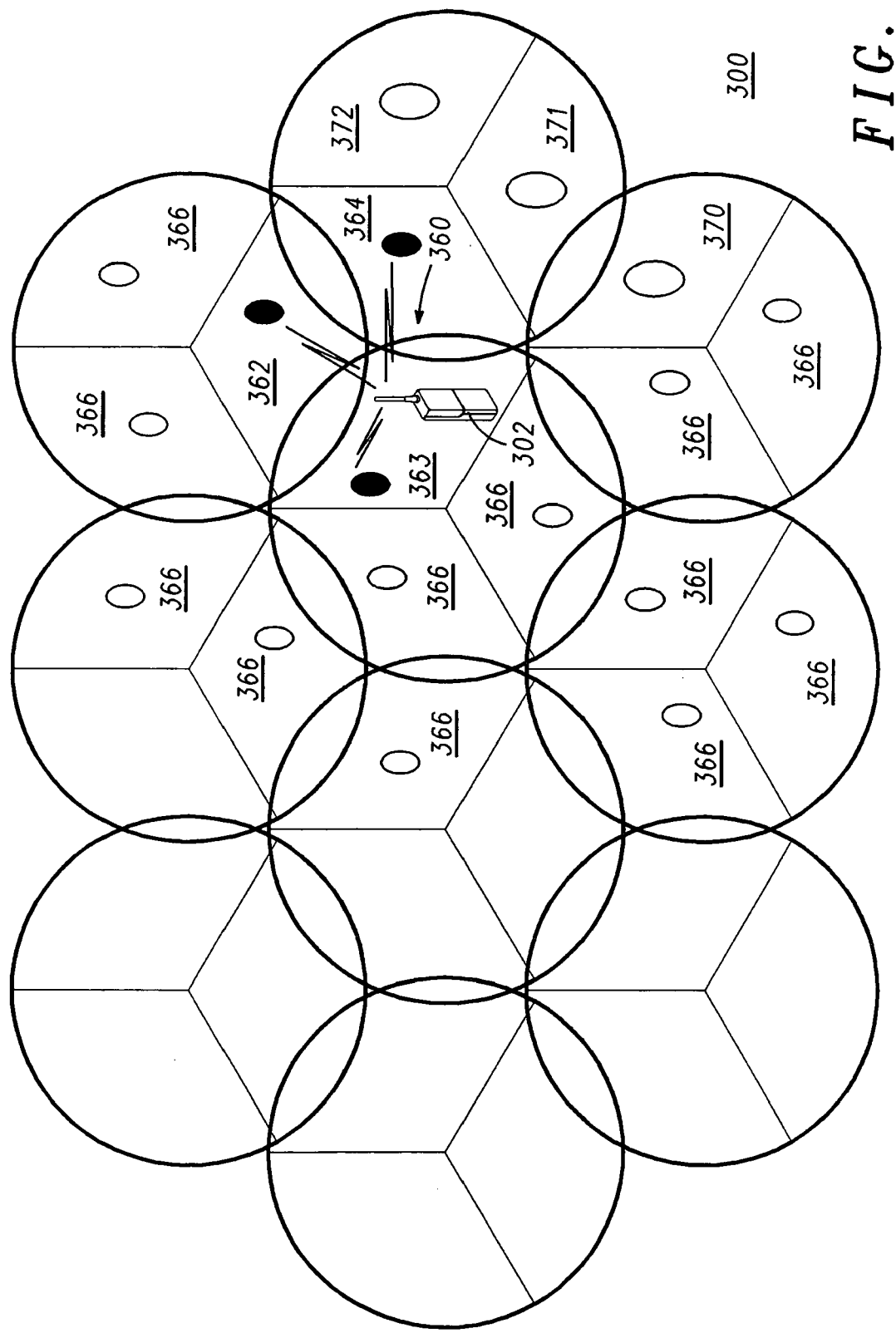
FIG. 3 representatively illustrates a wireless network in accordance with an exemplary embodiment of the present invention.

FIG. 3 representatively illustrates a wireless network 300 in accordance with an exemplary embodiment of the present invention. The wireless network of FIG. 3 is similar to the wireless network of FIG. 2 except that the handoff candidate list in FIG. 3 is generated in accordance with an embodiment of the invention.

As shown in FIG. 3, mobile station 302 is in a multi-sector handoff state 360 with a unique combination of a plurality of sectors 362, 363, 364. In other words, mobile station 302 is in a soft handoff state with multiple sectors and the combination of sectors mobile station 302 is in communication with is a unique combination. Although mobile station 302 is shown in a multi-sector handoff state 360 with three sectors, the mobile station 302 may be in a multi-sector handoff state 360 with any plurality of sectors and be within the scope of the invention.

Since the mobile station 302 is in a multi-sector handoff state 360 with a unique combination of a plurality of sectors 362, 363, 364, mobile station 302 is more likely to add one or more particular sectors to the multi-sector handoff state than other sectors. For example, since mobile station 302 is in the handoff state shown, it may be more likely that at least one target sector 370, 371, 372 are added to the multi-sector handoff state as an additional communication leg based on historical data of a mobile station 302 being in a multi-sector handoff state 360 with the unique combination of the plurality of sectors 362, 363, 364. That is to say, out of the plurality of available sectors 366 (which includes all of the sectors that would be available as per the prior art handoff candidate list for each active sector), the target sectors 371, 372, 373 have the highest probability of actually being added to the multi-sector handoff state 360 for a given unique combination of plurality of sectors 362, 363, 364. This may be, for example and without limitation, because the target sectors 371, 372, 373 were actually added to the multi-sector handoff state 360 in the past. This may be due for example to the handoff state with the particular combination of sectors being along a travel corridor where the target sectors are fairly constant given a limited direction of travel. Many other reasons may be present for target sectors having a higher probability of being selected, or have a history of being added, for a given multi-sector handoff state with a given unique combination of sectors.

In an embodiment, each time mobile station 302 is in the a multi-sector handoff state 360 with a unique combination of a plurality of sectors 362, 363, 364, the one or more target sectors 371, 372, 373 that are actually added to the multi-sector handoff state may be recorded. Iteratively recording the one or more target sectors added for each multi-sector handoff state for each unique combination of plurality of sectors for any mobile stations in wireless network 300 may generate a list of the target sectors with the highest probability of actual use (or target sectors that are historically actually used) when mobile station 302 is in a multi-sector handoff state with any given unique combination of plurality of sectors. In another embodiment, the list generated includes the only sectors that have actually been historically added. This data may be termed a historical data set and used to generate a handoff candidate list to communicate to a mobile station 302 in a particular multi-sector handoff state 360 with a corresponding unique combination of plurality of sectors 362, 363, 364.

In another embodiment, a predictive algorithm, for example and without limitation a network-planning and simulation tool known in the art, may be used to generate the at least one target sector 371, 372, 373 that has the highest probability of actually being used by a mobile station 302 in a multi-sector handoff state with a unique combination of a plurality of sectors 362, 363, 364. In this embodiment, the network-planning tool may be used to create a predictive data set that can be used to generate a handoff candidate list to communicate to a mobile station in a particular multi-sector handoff state with a corresponding unique combination of plurality of sectors. In another embodiment, the historical data set and the predictive data set may be used in any combination to create the handoff candidate list.

The above embodiments have the advantage of optimally generating a handoff candidate list that is independent of the prior art handoff candidate list generation process. For example, in an embodiment, handoff candidate list may not be generated in real-time, but calculated ahead of time and stored in memory as a look-up table. This relieves the base station and mobile station of the processing time and communication bandwidth required to generate these lists in real-time. Further, in accordance with the embodiments above, the handoff candidate list may be significantly smaller than the maximum length of the prior art handoff candidate list. This allows the mobile station to scan for handoff sectors in the shorter handoff candidate list quicker, allowing the mobile station to acquire a pilot signal faster. This permits the mobile station to handoff quicker and results in fewer dropped calls.

Figure 4:
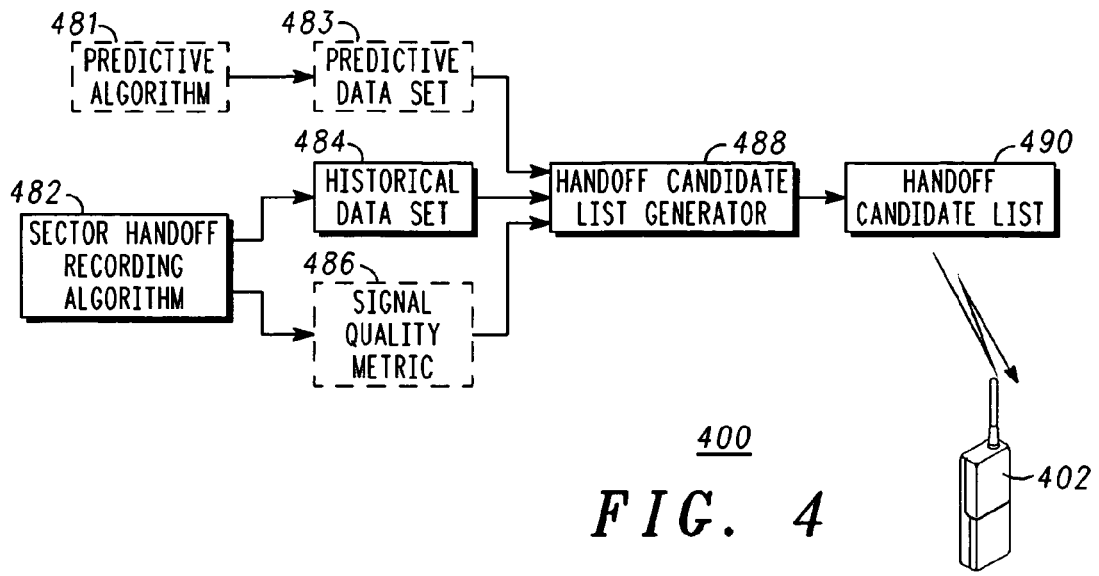
FIG. 4 representatively illustrates a block diagram of a method of generating and providing a handoff candidate list in accordance with an exemplary embodiment of the present invention.

FIG. 4 representatively illustrates a block diagram 400 of a method of generating and providing a handoff candidate list in accordance with an exemplary embodiment of the present invention. In an embodiment, a base station controller, for example, may include a sector handoff recording algorithm 482 for recording target sectors actually used when a mobile station is in a multi-sector handoff state with a unique combination of a plurality of sectors. Iteratively recording the one or more target sectors added for each multi-sector handoff state for each unique combination of plurality of sectors for any mobile stations in wireless network may generate a list of the target sectors with the highest probability of actual use when mobile station is in a multi-sector handoff state with any given unique combination of plurality of sectors. So, the target sectors actually used by mobile stations in a multi-sector handoff state with a unique combination of a plurality of sectors may be ranked according to the probability of actual use by a mobile station in such a handoff situation. This data may be termed a historical data set 484 and be communicated to a handoff candidate list generator 488, which may be used to generate a handoff candidate list 490 to communicate to a mobile station in a particular multi-sector handoff state with a corresponding unique combination of plurality of sectors.

In an embodiment, historical data set 484 may be used by handoff candidate list generator 488 to generate, for example and without limitation, a look-up table that corresponds to each multi-sector handoff state and any unique combination of a plurality of sectors. Subsequently, when a mobile station enters a multi-sector handoff state with any particular unique combination of plurality of sectors, the handoff candidate list 490 may be communicated to mobile station 402 via wireless link 494. Since the handoff candidate list 490 is a list limited to those target sectors that have the highest probability of actually being used with the mobile station in communication with the unique combination of the plurality of sectors, the handoff candidate list 490 is likely to have fewer entries than the prior art handoff candidate list.

This has the advantage in that the mobile station checks fewer pilot signals, and only checks for pilot signals from those target sectors that have actually been used when the mobile station is in contact with the unique combination of the plurality of sectors. This allows the mobile station 402 to more quickly establish a communication link with a target sector and reduce the number of dropped calls.

In an embodiment, when sectors are added to or deleted from wireless network, thereby altering the possible unique combinations of plurality of sectors, the prior art method of generating handoff candidate lists may be reverted to in order to generate an updated historical data set.

In another embodiment, optionally (as depicted by the dashed boxes), sector handoff recording algorithm 482 may also collect data on a signal quality metric 486 for the communication leg of each target sector in accordance with the above embodiment. Signal quality metric may include, for example, the signal to noise ratio, frame error rate, and the like, and may be collected for each target sector actually used in accordance with the above embodiment. In yet another embodiment, historical data set 484 and signal quality metric 486 may be used to rank plurality of target sectors. In yet another embodiment, historical data set 484 and signal quality metric 486 may be used by the handoff candidate list generator 488 to rank plurality of target sectors based on a weighted average of the probability of actually being used and the signal quality metric of each target sector.

In another embodiment, optionally (as depicted by the dashed boxes), a predictive algorithm 481 may be used to create a predictive data set 483. In an embodiment, predictive algorithm may be any cellular network-planning tool as is known in the art. Predictive data set 483 may be used to generate the at least one target sector that has the highest probability of actually being used by a mobile station 402 in a multi-sector handoff state with a unique combination of a plurality of sectors. In this embodiment, the predictive algorithm 481 may be used to create a predictive data set 483 that can then be subsequently used to generate a handoff candidate list 490 to communicate to a mobile station 402 in a particular multi-sector handoff state with a corresponding unique combination of plurality of sectors. In another embodiment, the historical data set 484 and the predictive data set 483 may be used in any combination to create the handoff candidate list 490. In an illustrative embodiment, when predictive data set 483 is used in combination with historical data set 484, the block diagram may include second handoff candidate list (not shown for clarity) in which the handoff candidate list generated from the predictive data set 483 is augmented with the historical data set 484 to create a more accurate and concise second handoff candidate list.

Figure 5:
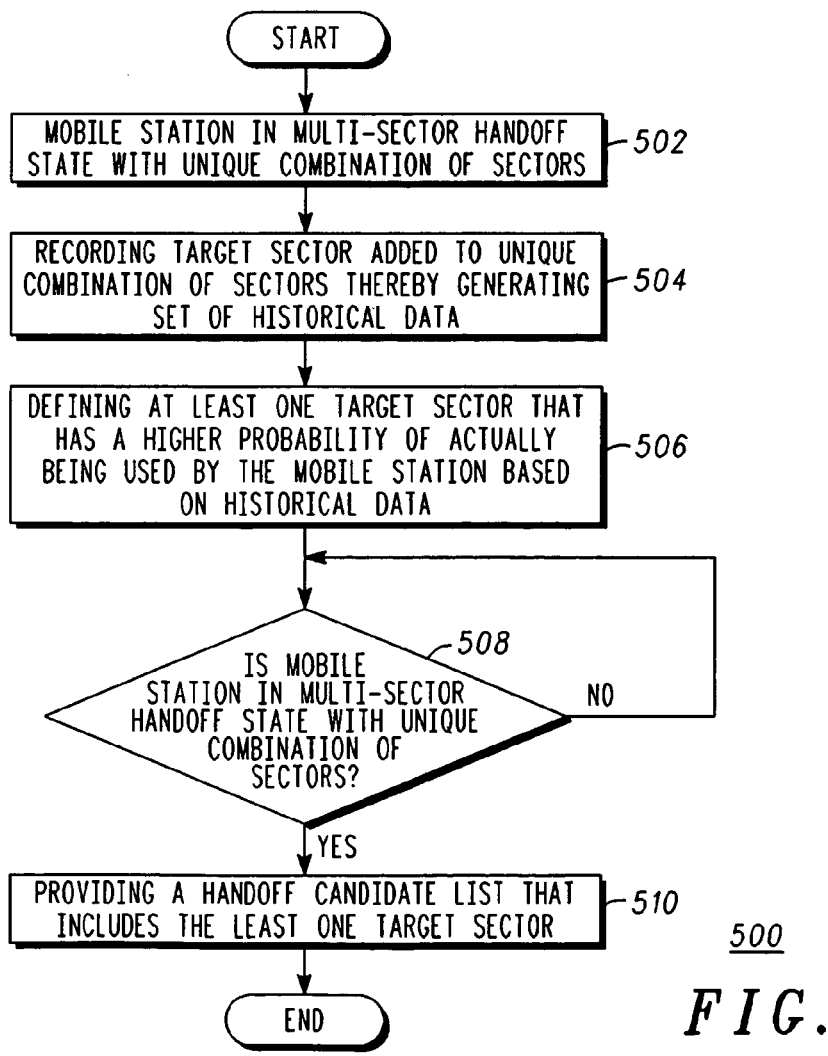
FIG. 5 representatively illustrates a flow diagram in accordance with an exemplary embodiment of the present invention for handoff candidate list selection.

FIG. 5 representatively illustrates a flow diagram 500 in accordance with an exemplary embodiment of the present invention for handoff candidate list selection. In step 502 a mobile station is in a multi-sector handoff state with a unique combination of a plurality of sectors. In step 504, the at least one target sector added to the unique combination of plurality of sectors is recorded, thereby creating a historical data set. Step 504 may be iteratively repeated for each mobile station in the wireless network in each multi-sector handoff state with each unique combination of a plurality of sectors. In an embodiment, mobile station may start out in a one-way handoff state with a single sector and record the sectors that are actually added. Although the handoff candidate list originating from the one-way handoff state may not be optimized, it may include sectors that were generated from a predictive algorithm, even though the sectors are never actually added to the handoff candidate list in practice.

In step 506, at least one target sector that has a higher probability of actually being used, or has actually been used, by a mobile station in a multi-sector handoff state with a unique combination of a plurality of sectors is defined based on historical data set. This may be a handoff candidate list. Optionally in step 506, at least one target sector may be determined based on a signal quality metric or a weighted average of a signal quality metric of each of the at least one target sector. In another embodiment, a handoff candidate list may have zero candidates. For example, in an embodiment for a unique combination of a plurality of sectors, a new sector may not be added, but only has handoff drops. In this case the handoff candidate list used for that unique combination of sections may have zero candidates in the handoff list sent to the mobile station.

In step 508, it is determined if subsequently a mobile station is in a multi-sector handoff state with a unique combination of a plurality of sectors. If not, return to the beginning of step 508. If so, the handoff candidate list is provided to mobile station in step 510, where the handoff candidate list includes one or more target sectors, taken from a pool of available sectors, having a higher probability of actually being used by a mobile station in a multi-sector handoff state with the unique combination of the plurality of sectors.

Figure 6:
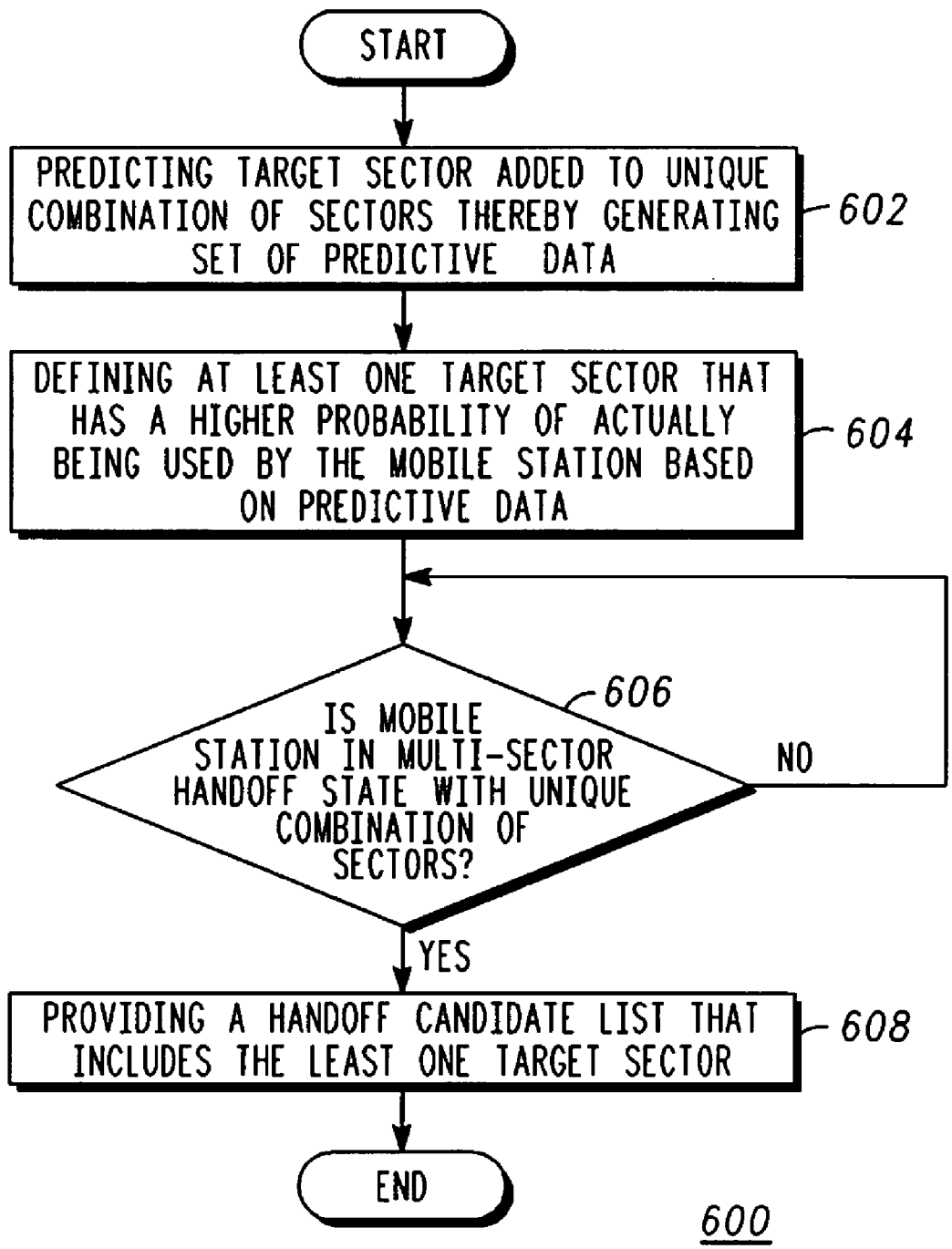
FIG. 6 representatively illustrates a flow diagram in accordance with another exemplary embodiment of the present invention for handoff candidate list selection.

FIG. 6 representatively illustrates a flow diagram 600 in accordance with another exemplary embodiment of the present invention for handoff candidate list selection. In step 602, a predictive algorithm may be used to generate a predictive data set that includes at least one target sector to be added to a unique combination of a plurality of sectors when a mobile is in a multi-sector handoff state. In step 604, at least one target sector that has a higher probability of actually being used by a mobile station in a multi-sector handoff state with a unique combination of a plurality of sectors is defined based on predictive data set. This may be a handoff candidate list. In another embodiment, a handoff candidate list may have zero candidates. For example, in an embodiment for a unique combination of a plurality of sectors, a new sector may not be added, but only has drops instead. This situation may result in a handoff candidate list being sent that has zero handoff candidates.

In step 606, it is determined if subsequently a mobile station is in a multi-sector handoff state with a unique combination of a plurality of sectors. If not, return to the beginning of step 606. If so, a handoff candidate list is provided to mobile station in step 608, where the handoff candidate list includes one or more target sectors, taken from a pool of available sectors, having a higher probability of actually being used by a mobile station in a multi-sector handoff state with the unique combination of the plurality of sectors. In another embodiment, mobile station may be in a one-way handoff state and generate a handoff candidate list based on the one-way handoff state.

In the foregoing specification, the invention has been described with reference to specific exemplary embodiments; however, it will be appreciated that various modifications and changes may be made without departing from the scope of the present invention as set forth in the claims below. The specification and figures are to be regarded in an illustrative manner, rather than a restrictive one and all such modifications are intended to be included within the scope of the present invention. Accordingly, the scope of the invention should be determined by the claims appended hereto and their legal equivalents rather than by merely the examples described above.

For example, the steps recited in any method or process claims may be executed in any order and are not limited to the specific order presented in the claims. Additionally, the components and/or elements recited in any apparatus claims may be assembled or otherwise operationally configured in a variety of permutations to produce substantially the same result as the present invention and are accordingly not limited to the specific configuration recited in the claims.

Benefits, other advantages and solutions to problems have been described above with regard to particular embodiments; however, any benefit, advantage, solution to problem or any element that may cause any particular benefit, advantage or solution to occur or to become more pronounced are not to be construed as critical, required or essential features or components of any or all the claims.

As used herein, the terms "comprise", "comprises", "comprising", "having", "including", "includes" or any variation thereof, are intended to reference a non-exclusive inclusion, such that a process, method, article, composition or apparatus that comprises a list of elements does not include only those elements recited, but may also include other elements not expressly listed or inherent to such process, method, article, composition or apparatus. Other combinations and/or modifications of the above-described structures, arrangements, applications, proportions, elements, materials or components used in the practice of the present invention, in addition to those not specifically recited, may be varied or otherwise particularly adapted to specific environments, manufacturing specifications, design parameters or other operating requirements without departing from the general principles of the same.

We claim:

1. A method of providing a handoff candidate list to a mobile station, comprising:
   providing the mobile station in a multi-sector handoff state with a unique combination of a plurality of sectors; and
   communicating the handoff candidate list to the mobile station, wherein the handoff candidate list comprises at least one target sector selected from a plurality of available sectors, and wherein the at least one target sector has a higher probability of actually being used by the mobile station in the multi-sector handoff state based on the unique combination of the plurality of sectors and at least one of a historical data set and a predictive data set of the unique combination of the plurality of sectors.

2. The method of claim 1, wherein the at least one target sector was actually selected previously.

3. The method of claim 1, wherein selecting comprises selecting the at least one target sector based on a weighted average of a higher probability of actually being selected and a signal quality metric of the at least one target sector.

4. The method of claim 1, further comprising selecting the at least one target sector, wherein the unique combination of the plurality of sectors and the historical data set are used to select the at least one target sector.

5. The method of claim 4, wherein the historical data set comprises the at least one target sector used most frequently when the mobile station is in the multi-sector handoff state with the unique combination of the plurality of sectors.

6. The method of claim 1, further comprising selecting the at least one target sector, wherein the unique combination of the plurality of sectors and the predictive data set are used to select the at least one target sector.

7. The method of claim 6, wherein the predictive data set comprises the at least one target sector used most frequently when the mobile station is in the multi-sector handoff state with the unique combination of the plurality of sectors.

8. A method of generating a handoff candidate list to provide to a mobile station, comprising:
   providing the mobile station in a multi-sector handoff state with a unique combination of a plurality of sectors;
   recording at least one target sector selected from a plurality of available sectors that is added to the unique combination of the plurality of sectors;
   iteratively performing the recording step whenever the mobile station is in the multi-sector handoff state with the unique combination of the plurality of sectors thereby defining the at least one target sector that has actually been used by the mobile station in the multi-sector handoff state with the unique combination of the plurality of sectors; and
   upon the mobile station entering the multi-sector handoff state with the unique combination of the plurality of sectors, providing the handoff candidate list to the mobile station, wherein the handoff candidate list comprises the at least one target sector.

9. The method of claim 8, further comprising ranking the at least one target sector based on a probability of actually being used by the mobile station.

10. The method of claim 8, wherein recording comprises recording a signal quality metric of the at least one target sector added to the unique combination of the plurality of sectors.

11. The method of claim 10, further comprising ranking the at least one target sector based on a probability of actually being used by the mobile station and the signal quality metric of the at least one target sector.

12. The method of claim 10, further comprising ranking the at least one target sector based on a weighted average of actually being used and the signal quality metric of the at least one target sector.

13. The method of claim 8, further comprising selecting the at least one target sector for inclusion into the handoff candidate list based on the unique combination of the plurality of sectors and a historical data set of the at least one target sector actually used by the mobile station in the multi-sector handoff state with the unique combination of the plurality of sectors.

14. The method of claim 13, wherein the historical data set comprises the at least one target sector used most frequently when the mobile station is in the multi-sector handoff state with the unique combination of the plurality of sectors.

15. The method of claim 8, further comprising for each unique combination of the plurality of sectors in each of a plurality of multi-sector handoff states in a wireless network, recording the at least one target sector selected from the plurality of available sectors that is added as the mobile station transitions among the unique combinations of the plurality of sectors in each of the plurality of multi-sector handoff states.

16. A base station controller performing a method of generating a handoff candidate list to provide to a mobile station, comprising:

communicatively coupling the base station controller to the mobile station while the mobile station is in a multi-sector handoff state with a unique combination of a plurality of sectors;

recording at least one target sector selected from a plurality of available sectors that is added to the unique combination of the plurality of sectors;

iteratively performing the recording step whenever the mobile station is in the multi-sector handoff state with the unique combination of the plurality of sectors thereby defining the at least one target sector that has actually been used by the mobile station in the multi-sector handoff state with the unique combination of the plurality of sectors; and upon the mobile station entering the multi-sector handoff state with the unique combination of the plurality of sectors, providing the handoff candidate list to the mobile station, wherein the handoff candidate list comprises the at least one target sector.

17. The base station controller of claim 16, further comprising ranking the at least one target sector based on a probability of actually being used by the mobile station.

18. The base station controller of claim 16, wherein recording comprises recording a signal quality metric of the at least one target sector added to the unique combination of the plurality of sectors.

19. The base station controller of claim 18, further comprising ranking the at least one target sector based on a probability of actually being used by the mobile station and the signal quality metric of the at least one target sector.

20. The base station controller of claim 18, further comprising ranking the at least one target sector based on a weighted average of actually being used and the signal quality metric of the at least one target sector.

21. The base station controller of claim 16, further comprising selecting the at least one target sector for inclusion into the handoff candidate list based on the unique combination of the plurality of sectors and a historical data set of the at least one target sector actually used by the mobile station in the multi-sector handoff state with the unique combination of the plurality of sectors.

22. The base station controller of claim 16, further comprising for each unique combination of the plurality of sectors in each of a plurality of multi-sector handoff states in a wireless network, recording the at least one target sector selected from the plurality of available sectors that is added as the mobile station transitions among the unique combinations of the plurality of sectors in each of the plurality of multi-sector handoff states.

* * * * *